US007257551B2

(12) United States Patent  
Oskorep et al.

(10) Patent No.: US 7,257,551 B2
(45) Date of Patent: Aug. 14, 2007

(54) YEAR-ROUND DECORATIVE LIGHTS WITH SELECTABLE HOLIDAY COLOR SCHEMES AND ASSOCIATED METHODS

(75) Inventors: Frank Joseph Oskorep, Elk Grove Village, IL (US); John Jeffery Oskorep, Chicago, IL (US)

(73) Assignee: Year-Round Creations, LLC, Chicago, IL (US)

( * ) Notice: Subject to any disclaimer, the term of this patent is extended or adjusted under 35 U.S.C. 154(b) by 156 days.

(21) Appl. No.: 11/100,254

(22) Filed: Apr. 5, 2005

(65) Prior Publication Data

US 2005/0168983 A1 Aug. 4, 2005

Related U.S. Application Data

(63) Continuation-in-part of application No. 10/731,975, filed on Dec. 10, 2003, now Pat. No. 7,102,301, which is a continuation of application No. 10/144,149, filed on May 10, 2002, now Pat. No. 6,690,120.

(51) Int. Cl.
*G06F 17/30* (2006.01)
*B42D 15/00* (2006.01)

(52) U.S. Cl. .............................. 705/27; 283/56; 40/584; 362/806

(58) Field of Classification Search ................... 705/26, 705/27, 28, 29; 283/56; 40/541, 542, 544, 40/463, 584, 547, 550, 553; 362/227, 236, 362/251, 806, 812
See application file for complete search history.

(56) References Cited

U.S. PATENT DOCUMENTS 3,623,066 A 11/1971 Norris (Continued)

FOREIGN PATENT DOCUMENTS

WO WO 99/10867 3/1999

(Continued)

OTHER PUBLICATIONS

Guerrero, Lucio; "End the Xmas light fight: Just leave them up"; Red Streak; Tuesday, Dec. 2, 2003; p. 6, vol. 22, No. 22, Chicago Sun-Times Inc.; Chicago, IL, USA.

(Continued)

*Primary Examiner*—Thuy Vinh Tran
(74) *Attorney, Agent, or Firm*—John J. Oskorep, Esq.

(57) ABSTRACT

A decorative light strand has user-selectable color schemes corresponding to each holiday for year-round use. In one illustrative embodiment, the light strand has a plurality of lights; a decorating selector comprising a switch which provides a plurality of user-selectable settings; and logic coupled to the switch and the plurality of lights to provide different holiday color schemes in response to the user-selectable settings. A method of advertising the same includes the steps of providing a set of packaged year-round holiday lighting products for sale; providing a first displayed advertisement for the packaged year-round holiday lighting products during a first holiday season which corresponds to a first one of the holiday color schemes, the first displayed advertisement including first indicia representative of the first holiday season; providing a second displayed advertisement for the packaged year-round holiday lighting products during a second holiday season which corresponds to a second one of the holiday color schemes, the second displayed advertisement including second indicia representative of the second holiday season; and providing a third displayed advertisement for the packaged year-round holiday lighting products during a third holiday season which corresponds to a third one of the holiday color schemes, the third displayed advertisement including third indicia representative of the third holiday season. This approach is more efficient and economical for stores which sell and advertise holiday decorations.

11 Claims, 10 Drawing Sheets

U.S. PATENT DOCUMENTS

| | | | |
|---|---|---|---|
| 3,789,211 | A | 1/1974 | Kramer |
| 3,946,244 | A | 3/1976 | Davis, Jr. |
| 4,034,494 | A * | 7/1977 | Lane ........................... 40/427 |
| 4,153,860 | A | 5/1979 | Vonick |
| 4,215,277 | A | 7/1980 | Weiner et al. |
| 4,682,079 | A | 7/1987 | Sanders et al. |
| 4,780,621 | A | 10/1988 | Bartleucci et al. |
| 4,890,000 | A | 12/1989 | Chou |
| 5,008,595 | A | 4/1991 | Kazar |
| 5,245,519 | A | 9/1993 | Openiano |
| 5,300,864 | A | 4/1994 | Allen, Jr. |
| 5,359,506 | A | 10/1994 | Koleno |
| 5,451,842 | A | 9/1995 | Chien |
| 5,629,587 | A | 5/1997 | Gray et al. |
| 5,747,940 | A | 5/1998 | Openiano |
| 5,749,646 | A | 5/1998 | Brittell |
| 5,911,501 | A | 6/1999 | Katz |
| 5,944,408 | A | 8/1999 | Tong et al. |
| 5,980,062 | A | 11/1999 | Bell |
| 6,015,218 | A | 1/2000 | Snell |
| 6,033,089 | A | 3/2000 | Tesauro |
| 6,050,701 | A | 4/2000 | Stone |
| 6,064,975 | A | 5/2000 | Moon |
| 6,143,381 | A * | 11/2000 | Hawkins ........................ 428/7 |
| 6,150,774 | A | 11/2000 | Mueller et al. |
| 6,280,803 | B1 * | 8/2001 | Gordy, Jr. .................... 428/18 |
| 6,285,140 | B1 | 9/2001 | Ruxton |
| 6,299,338 | B1 | 10/2001 | Levinson et al. |
| 6,309,086 | B1 | 10/2001 | Tomlinson |
| 6,364,137 | B1 | 4/2002 | Glauth |
| 6,384,545 | B1 | 5/2002 | Lau |
| 6,424,096 | B1 | 7/2002 | Lowe et al. |
| 6,577,080 | B2 | 6/2003 | Lys et al. |
| 6,608,453 | B2 | 8/2003 | Morgan et al. |
| 6,686,701 | B1 | 2/2004 | Fullarton |
| 6,690,120 | B2 | 2/2004 | Oskorep et al. |
| 7,139,617 | B1 * | 11/2006 | Morgan et al. ................ 700/17 |
| 2002/0129524 | A1 | 9/2002 | Haines |
| 2003/0079387 | A1 * | 5/2003 | Derose ......................... 40/544 |
| 2004/0066148 | A1 | 4/2004 | Oskorep |
| 2004/0150994 | A1 | 8/2004 | Kazar |
| 2005/0040772 | A1 | 2/2005 | Guzman |
| 2005/0047132 | A1 | 3/2005 | Dowling |

FOREIGN PATENT DOCUMENTS

| | | |
|---|---|---|
| WO | WO 99/31560 | 6/1999 |
| WO | WO 02/069306 A2 | 9/2002 |
| WO | WO 02/098182 A2 | 12/2002 |
| WO | WO 03/026358 A1 | 3/2003 |
| WO | WO 03/055273 A2 | 7/2003 |
| WO | WO 03/067934 | 8/2003 |

OTHER PUBLICATIONS

Guerrero, Lucio; "Lights go up, never come down"; Chicago Sun-Times; Wednesday Dec. 3, 2003; p. 14, vol. 56, No. 258, Chicago Sun-Times Inc.; Chicago, IL, USA.

Mullins, Michelle; "No-fuss lighting"; Daily Southtowner; Thursday, Dec. 4, 2003; pp. B1 & B6, vol. 26, No. 282, Midwest Suburban Publishing; Chicago, IL, USA.

U.S. Appl. No. 10/144,149; Oskorep et al; Entitled "Year-Round Decorative Lights With Selectable Holiday Color Schemes".

Select pages from www.colorkinetics.com of Color Kinetics, Inc.; published at least as of Dec. 17, 2003.

Reardon, Patrick T., "When It comes to expressing civic pride or public spirit it's hard to top a Skyscraper", Chicago Tribune, Thursday Apr. 29, 2004, pp. 1 and 4, Section 5, Chicago Tribune.

* cited by examiner

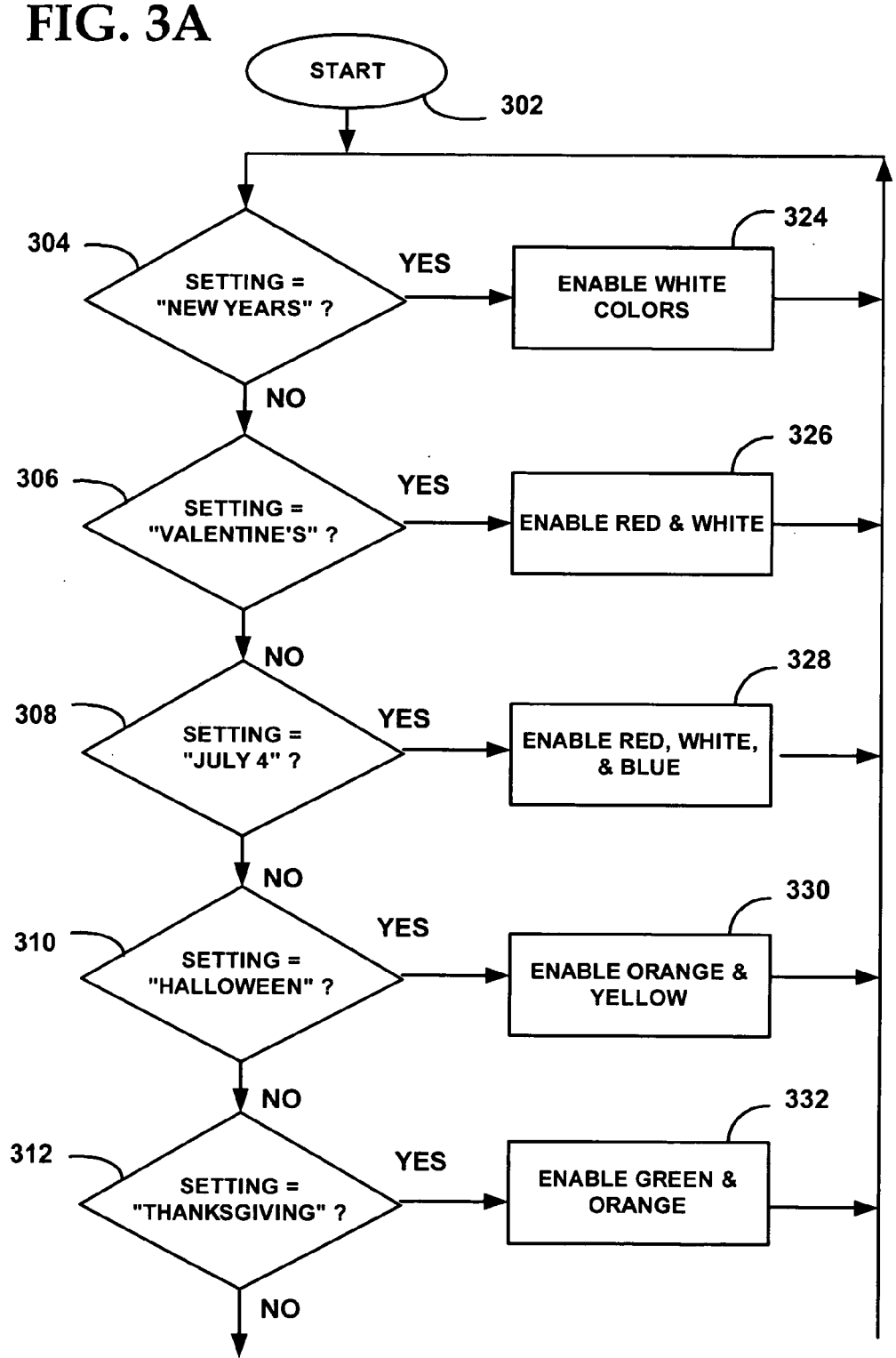

FIG. 4

| LED COLOR | OFF | NEW YEAR'S/WHITE | VALENTINES/SWEET | JULY4/MEMORIAL | HALLOWEEN | THANKSGIVING | XMAS | HANUKKAH | PARTY 1 | PARTY 2 |
|---|---|---|---|---|---|---|---|---|---|---|
| R | | X | X | X | | X | X | | X | |
| Y | | | | | X | | | X | X | |
| W | | X | X | X | | | | | | X |
| G | | | | | | | X | | | |
| Bl | | | | X | | | X | | | X |
| O | | | | | X | X | | | | |
| R | | | X | X | | X | X | | X | |
| Y | | | | | X | | | X | X | |
| W | | X | X | X | | | | | | X |
| G | | | | | | | X | | | |
| Bl | | | | X | | | X | | | X |
| O | | | | | X | X | | | | |
| R | | | X | X | | X | X | | X | |
| Y | | | | | X | | | X | X | |
| W | | X | X | X | | | | | | X |
| G | | | | | | | X | | | |
| Bl | | | | X | | | X | | | X |
| O | | | | | X | X | | | | |
| R | | | X | X | | X | X | | X | |
| Y | | | | | X | | | X | X | |
| W | | X | X | X | | | | | | X |
| G | | | | | | | X | | | |
| Bl | | | | X | | | X | | | X |

"X" = ON
NO "X" = OFF

TRUTH TABLE LOGIC

| Setting | Setting | RED | YELLOW | WHITE | GREEN | BLUE | ORANGE |
|---|---|---|---|---|---|---|---|
| New Year's/ White | 1 | 1 | 1 | 0 | 1 | 1 | 1 |
| Valentine's /Sweetest | 2 | 0 | 1 | 0 | 1 | 1 | 1 |
| July 4/ Memorial | 3 | 0 | 1 | 0 | 1 | 0 | 1 |
| Halloween | 4 | 1 | 0 | 1 | 1 | 1 | 0 |
| Thanksgiving | 5 | 1 | 1 | 1 | 0 | 1 | 0 |
| Xmas | 6 | 0 | 1 | 1 | 0 | 1 | 1 |
| Hanukkah | 7 | 1 | 0 | 1 | 1 | 0 | 1 |
| Party 1 | 8 | 0 | 0 | 1 | 1 | 1 | 1 |
| Party 2 | 9 | 1 | 1 | 0 | 1 | 0 | 1 |
| OFF | 0 | 1 | 1 | 1 | 1 | 1 | 1 |

500 ic lights), and more particularly to decorative light strands having controls for selecting different color schemes corresponding to major holidays and other occasions.

YEAR-ROUND DECORATIVE LIGHTS WITH SELECTABLE HOLIDAY COLOR SCHEMES AND ASSOCIATED METHODS

CROSS-REFERENCE TO RELATED APPLICATION

This application is a continuation-in-part of U.S. application Ser. No. 10/731,975 having a filing date of Jan. 10, 2003, now U.S. Pat. No. 7,102,301, which is a continuation of U.S. application Ser. No. 10/144,149 having a filing date of May 10, 2002 and issued as U.S. Pat. No. 6,690,120 B2, and claims priority thereto.

BACKGROUND

1. Field of the Technology

The present invention relates generally to decorative lights such as decorative holiday lights (e.g. Christmas lights), and more particularly to decorative light strands having controls for selecting different color schemes corresponding to major holidays and other occasions.

2. Description of the Related Art

Conventional decorative lights are typically fixed in color and celebratory purpose. One type of conventional light strand includes a plurality of lights which have the same single color (e.g. all white or all red). Another conventional light strand includes a plurality of lights which are multi-colored (e.g. red, green, white, blue, and yellow) and lit all at the same time. Many of these lights are suitably colored for the Christmas holidays; e.g. solid red and green, although other multi-colored combinations are popular. Some light strands provide for a "flashing" or "blinking" of lights in a random or set fashion. An end-user of Christmas lights typically hangs one or more light strands for the holiday (indoors or outdoors), and takes them down and puts them into storage after the holiday is over.

Holidays other than Christmas are celebrated as well, although light strands for these occasions are difficult to find if they even exist at all. For Independence Day and Memorial Day, the color combination of red, white, and blue is popular. For Hanukkah, the colors of blue and gold are popular. For Halloween, the color combination of orange and yellow is popular. For these and other celebrated holidays, an individual often purchases different decorations just before the holiday and hangs them up. For other occasions, such as parties, birthdays, anniversaries, showers, graduations, etc., one typically has to purchase other suitable decorations and decorate with them. These decorative items are hung up for the occasion and thereafter taken down.

An issue with most any decorative product is that of inventory control and distribution. For light strands, there are many varieties of color schemes that are suited only to particular geographic regions (e.g. colors of state/country flag), particular regional celebrations or holidays, etc. Having such different color-schemed lighting strands for each and every different celebratory purpose or geographic region creates several different product types, making manufacturing, inventory control, and distribution difficult.

The closest prior art relating to the present invention of which the inventors are aware is a Christmas light strand (manufacturer unknown) which has a button switch for providing eight (8) different lighting variations. The light strand has four (4) different colored lights in the following repeated sequence: red, green, orange, and blue. The lighting variations are described as follows: 1—"COMBINATION; 2—"IN WAVES"; 3—"TWINKLE/FLASH"; 4—"SLO-GLO"; 5—"SEQUENTIAL"; 6—"SLOW FADE"; 7—"CHASING/FLASH"; AND 8—"STEADY ON". For the $2^{nd}$, $3^{rd}$, $5^{th}$, and $7^{th}$ settings, somewhat random flashing of all of the colors are provided in subtle variations. For the $4^{th}$ and $6^{th}$ settings, fading in and out of all of the colors (in sequence and simultaneously, respectively) are provided. All colors are lit solid in the $8^{th}$ setting. Finally, the $1^{st}$ setting sequences through the $1^{st}$ through $7^{th}$ settings. This light strand and its settings are designed solely for Christmas; no different color schemes or holiday schemes are provided.

Accordingly, what is needed is a decorative lighting apparatus which overcomes the deficiencies of the prior art.

SUMMARY

Broadly, a decorative light strand has user-selectable color schemes which correspond to each major U.S. holiday for year-round use. In one illustrative embodiment, the light strand has a plurality of lights; a decorating selector comprising a switch which provides a plurality of user-selectable settings; and logic coupled to the switch and the plurality of lights to provide different holiday color schemes in response to the user-selectable settings. A method of advertising the same includes the steps of providing a set of packaged year-round holiday lighting products; providing a first displayed advertisement for the packaged year-round holiday lighting products during a first holiday season, the first displayed advertisement including first indicia representative of the first holiday season; providing a second displayed advertisement for the packaged year-round holiday lighting products during a second holiday season, the second displayed advertisement including second indicia representative of the second holiday season; and providing a third displayed advertisement for the packaged year-round holiday lighting products during a third holiday season, the third displayed advertisement including third indicia representative of the third holiday season. This approach is more efficient and economical for stores which sell and advertise holiday decorations.

BRIEF DESCRIPTION OF THE DRAWINGS

FIG. 4 is a color/light enabling scheme for the representative arrangement of colored lights;

FIG. 5 is a truth table for the logic utilized in the electronics of FIG. 2;

DETAILED DESCRIPTION OF THE PREFERRED EMBODIMENTS

A decorative light strand has user-selectable color schemes corresponding to each holiday for year-round use. In one illustrative embodiment, the light strand has a plurality of lights; a decorating selector comprising a switch which provides a plurality of user-selectable settings; and logic coupled to the switch and the plurality of lights to provide different holiday color schemes in response to the user-selectable settings. A method of advertising the same includes the steps of providing a set of packaged year-round holiday lighting products for sale; providing a first displayed advertisement for the packaged year-round holiday lighting products during a first holiday season, the first displayed advertisement including first indicia representative of the first holiday season; providing a second displayed advertisement for the packaged year-round holiday lighting products during a second holiday season, the second displayed advertisement including second indicia representative of the second holiday season; and providing a third displayed advertisement for the packaged year-round holiday lighting products during a third holiday season, the third displayed advertisement including third indicia representative of the third holiday season. This approach is more efficient and economical for stores which sell and advertise holiday decorations.

Figure 1:
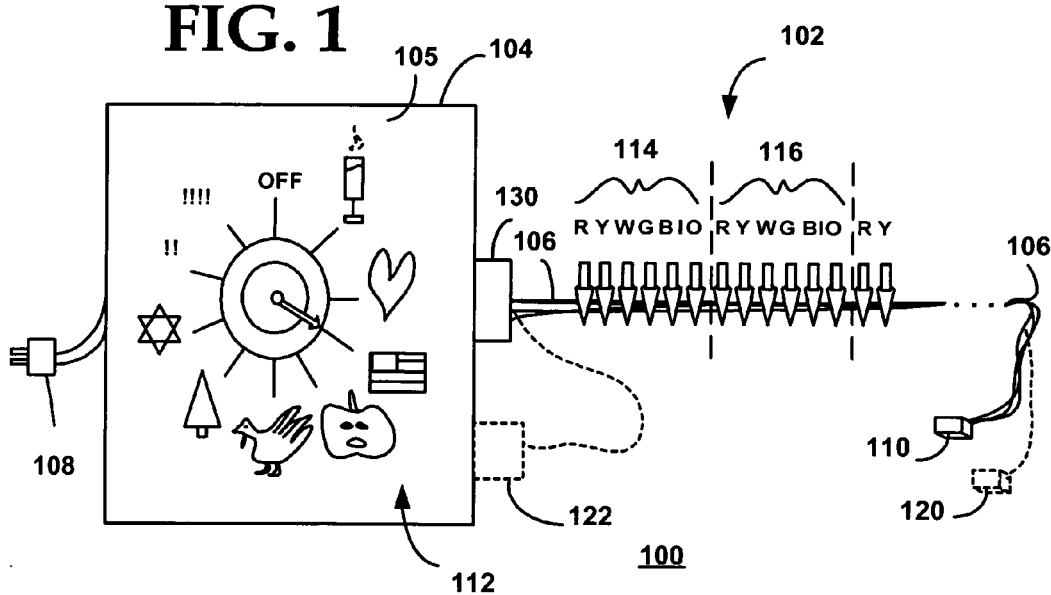
FIG. 1 is an illustration of a decorative lighting apparatus which includes a representative arrangement of colored lights and a decorating selector.

FIG. 1 is an illustration of a decorative lighting apparatus 100 which includes a representative arrangement of colored lights 102 and a decorating selector 104. Attached to decorating selector 104 is a conventional A/C power cord and plug 108 for connecting to a conventional A/C outlet for powering and illuminating colored lights 102. When decorative lighting apparatus 100 is plugged in and turned on, a plurality of wires 106 carry electrical current to light up some selected colored lights 102. Colored lights 102 may include any suitable number of different colors and, in this embodiment, colored lights 102 include six (6) colors of red (R), yellow (Y), white (W), green (G), blue (Bl), and orange (O). The light bulbs/sockets are preferably spaced relatively close to one another, for example, about 1 centimeter apart.

Colored lights 102 are positioned/sequenced by color in a predetermined manner along wires 106. In the embodiment shown in FIG. 1, the sequence is red, yellow, white, green, blue, and orange. This sequence is shown along a first light strand portion 114, which is repeated a suitable number of times along wires 106 as shown once in a second light strand portion 116.

Decorating selector 104 includes a housing 105 and a switch 112 which provides for a plurality of decorative holiday settings. In this embodiment, switch 112 is a 10-position rotary switch, single-throw. However, the number of detent positions for switch 112 may be more or less depending on how many decorative settings are desired. In an alternate embodiment, switch 112 is a conventional pushbutton switch which provides the plurality of different settings sequentially when pressing the button.

In this embodiment, the decorative holiday settings provided by switch 112 are provided for most major U.S. holidays. As apparent from the icons provided on housing 105 (via a plastic overlay adhesively attached on the housing), the holiday settings include (in clockwise order) a New Year's holiday setting, a Valentines/Sweetest Day holiday setting, an Independence/Memorial Day holiday setting, a Halloween holiday setting, a Thanksgiving holiday setting, a Christmas holiday setting, and a Hanukkah holiday setting. Also included are a Party-1 setting (!!) and a Party-2 setting (!!!!).

In one illustrative example, the New Year's holiday setting enables the plurality of white lights; the Valentines/Sweetest Day holiday setting enables the pluralities of red and white lights; the Independence/Memorial Day holiday setting enables the pluralities of red, white, and blue lights; the Halloween holiday setting enables the pluralities of orange and yellow lights; the Thanksgiving holiday setting enables the pluralities of orange and green lights; the Christmas holiday setting enables the pluralities of red and green lights; and the Hanukkah holiday setting enables the pluralities of blue and yellow (gold) lights. Also, the Party-1 setting enables the pluralities of red and yellow lights, and the Party-2 setting enables the pluralities of white and blue lights.

Advantageously, this strand of decorative lights can be permanently hung and utilized year-round for major holidays and/or other suitable occasions. Other suitable color schemes for each holiday may be provided; the above are merely examples. As examples, the Christmas color scheme may illuminate all of the colored lights; the Valentine's Day color scheme may illuminate red lights only; the Halloween color scheme may illuminate orange lights only or orange and white lights; etc. Also, other holidays and occasions may be provided for as well, including Easter (e.g. yellow lights; or orange and yellow lights) and St. Patrick's Day (e.g. green lights; green and white lights; or green and yellow lights).

A male connecting plug 130 is found at the front end of wires 106, and a female connecting socket 110 is found at the rear end of wires 106. Male connecting plug 130 mates with a female connecting socket provided on housing 105, which is the same type as female connecting socket 110. Female connecting socket 110 is provided so that additional colored lights of the same type may be added to the lighting strand and controlled by the same decorating selector 104.

In this embodiment, connecting plug 130 and socket 110 provide for eight (8) line connections (one control/logic line for each color, one line for A/C power, and one line for ground). With the configurations provided in FIG. 1, decorating selector 104 and colored lights 102 may be separate and independent devices and sold separately from one another. In an alternate embodiment, connecting plug 130 and socket 110 provide for only six (6) line connections (one control/logic line for each color) where lighting apparatus 100 is also equipped with a conventional A/C plug 122 and A/C socket 120 along wires 106. With this alternative approach, additional colored lights of different types may be added to the lighting strand using A/C socket 120.

Figure 2:
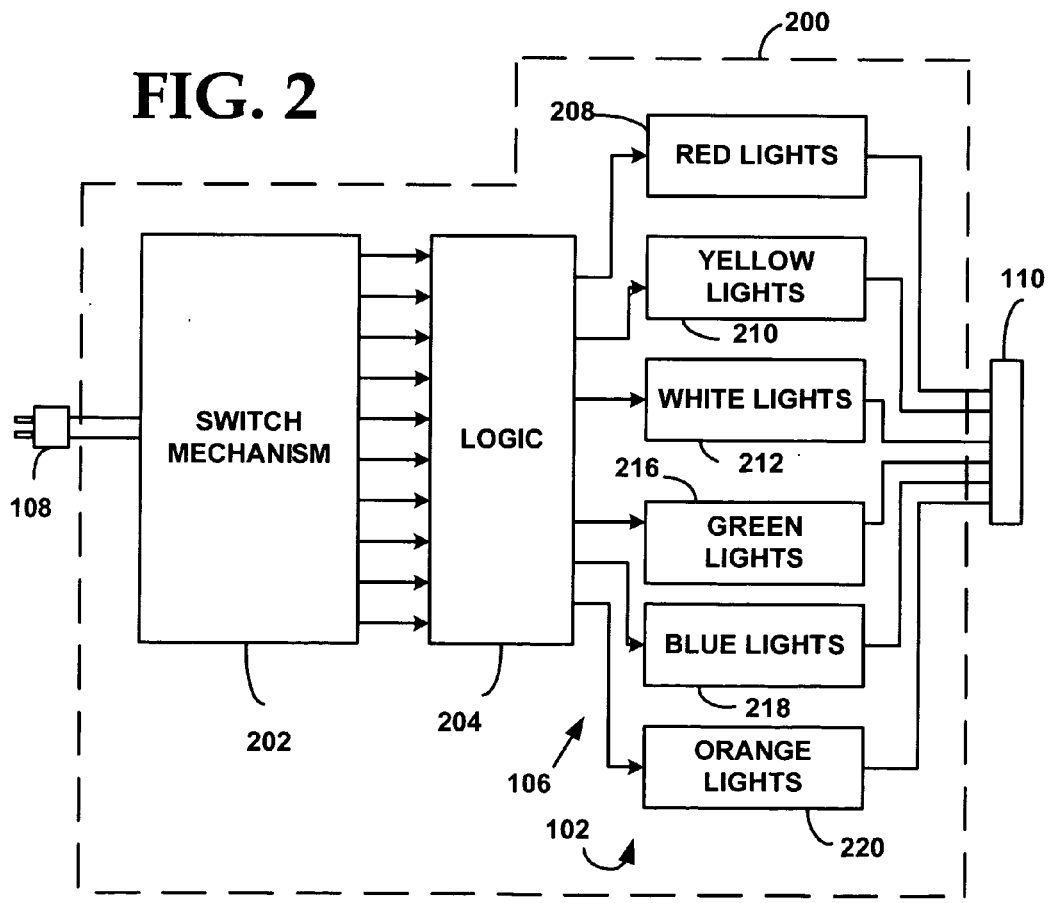
FIG. 2 is a schematic block diagram of electronics for the decorative lighting apparatus of FIG. 1.

FIG. 2 is a schematic block diagram of electronics 200 for decorative lighting apparatus 100 of FIG. 1. Electronics 200 of FIG. 2 include a switch mechanism 202, logic 204, and colored lights 102. Switch mechanism 202 has a plurality of logic outputs which change signal level based on the position of switch 112 (FIG. 1). Colored lights 102 of FIG. 2, which appear to be a single strand in FIG. 1, may actually be separately wired strands which are intertwined and include a strand of red lights 208, a strand of yellow lights 210, a strand of white lights 212, a strand of green lights 216, a strand of blue lights 218, and a strand of orange lights 220. Although each strand has a separate wire for power, they all may share the same ground wire. Each end of each separate strand of colored lights 102 is coupled to a different logic output from logic 204 so that each strand can be selectively enabled/disabled based on the position of switch 112 (FIG. 1). Logic 204 may be simple hardware gates, for example, or a microprocessor which is programmed with embedded software logic.

Figure 3B:
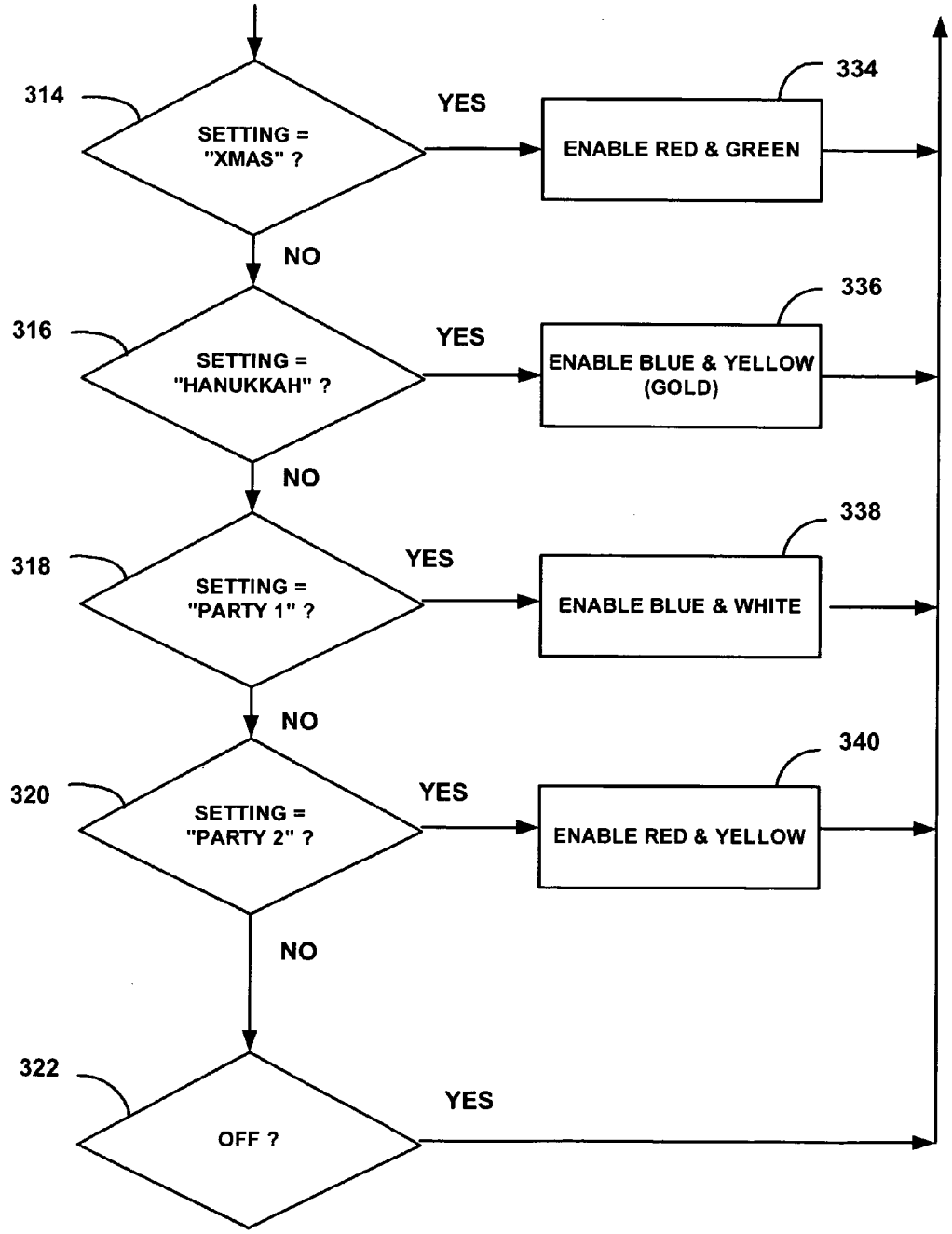
FIG. 3 is a flowchart which describes a method of selecting holiday color schemes with the decorative lighting apparatus of FIG. 1.

FIG. 3 is a flowchart which describes a method of selecting holiday color schemes using the decorative lighting apparatus 100 of FIG. 1. Beginning at a start block 302 in FIG. 3, if the switch setting is detected to be "New Year's" (step 304), then the logic enables the plurality of white lights only (step 324). If the switch setting is detected to be "Valentines/Sweetest Day" (step 306), then the logic enables the pluralities of red and white lights only (step 326). If the switch setting is detected to be "July 4/Memorial Day" (step 308), then the logic enables the pluralities of red, white, and blue lights only (step 328). If the switch setting is detected to be "Halloween" (step 310), then the logic enables the pluralities of orange and yellow lights only (step 330). If the switch setting is detected to be "Thanksgiving" (step 312), then the logic enables the pluralities of orange and green lights only (step 332). If the switch setting is detected to be "Christmas" (step 314), then the logic enables the pluralities of red and green lights only (step 334). If the switch setting is detected to be "Hanukkah" (step 316), then the logic enables the pluralities of blue and yellow (gold) lights only (step 336). If the switch setting is detected to be "Party-1" (step 318), then the logic enables the pluralities of red and yellow lights only (step 338). If the switch setting is detected to be "Party-2" (step 320), then the logic enables the pluralities of blue and white lights only (step 340). If the switch setting is detected to be "Off" (step 322), then no lights are enabled. The switch setting is continuously monitored so that, when set differently, the appropriate decorating lighting scheme is displayed.

FIG. 4 is a light arrangement table 400 which shows the color/light enabling scheme in the representative sequence of colored lights. Again, the representative sequence of colors shown in first and second lighting strand portions 114 and 116 is red, yellow, white, green, blue, and orange. An "X" indicates that a particular colored light is ON, whereas no "X" indicates that the particular colored light is OFF. This figure illustrates how the decorating lighting apparatus will appear when selected colors are enabled/disabled. As apparent, the sequence of colors may be important depending on the desired appearance. For example, see the appropriate spacing of colors for the "July 4$^{th}$" setting which displays red, white, and blue with a exactly single non-lit bulb space in between each lit bulb.

In FIG. 5, a truth table for the logic utilized in the electronics of FIG. 2 is shown. The logic assumes the following color-wireline order: red, yellow, white, green, blue, and orange. For the "New Year's" setting, the wired lines must be set as "110111"; for the "Valentine's" setting, the wired lines must be set as "010111"; for the "July 4" setting, the wired lines must be set as "010101"; for the "Halloween" setting, the wired lines must be set as "101110"; for the "Thanksgiving" setting, the wired lines must be set as "111010"; for the "Christmas" setting, the wired lines must be set as "011011"; for the "Hanukkah" setting, the wired lines must be set as "101101"; for the "Party-1" setting, the wired lines must be set as "001111"; for the "Party-2" setting, the wired lines must be set as "110101"; and for the "Off" setting, the wired lines must be set as "111111".

Figure 6:
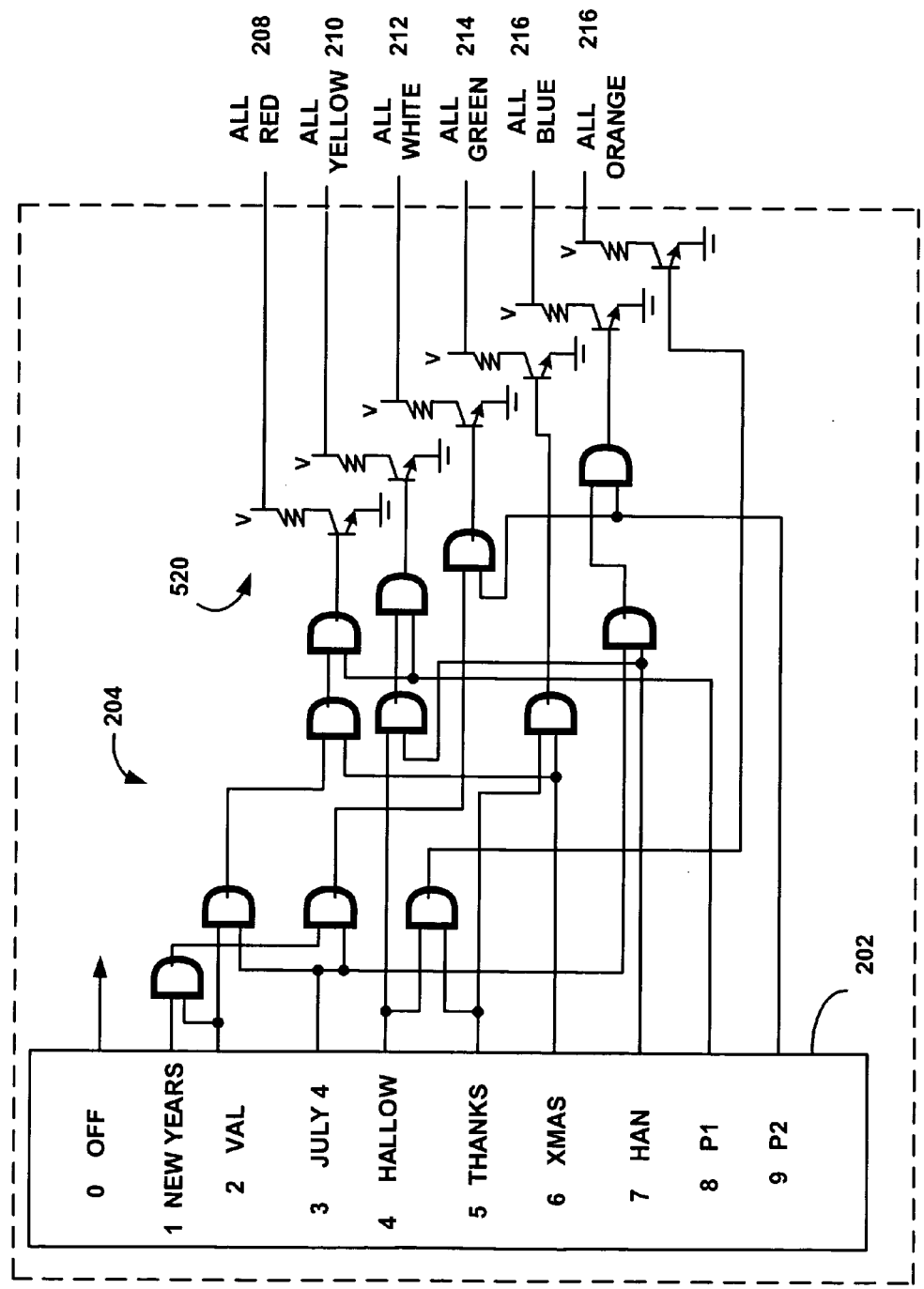
FIG. 6 is a detailed schematic diagram of the logic in the electronics of FIG. 2.

FIG. 6 is a detailed schematic diagram of the logic 204 in the electronics of FIG. 2. Switch mechanism 202 is configured such that the outputs provide the following logic: the "Off" setting=0111111111; the "New Year's" setting=1011111111; the "Valentine's" setting=1101111111; the "July 4" setting=1110111111; the "Halloween" setting=1111011111; the "Thanksgiving" setting=1111101111; the "Christmas" setting=1111110111; the "Hanukkah" setting=1111111011; the "Party-1" setting=1111111101; the "Party-2" setting=1111111110. Thus, given the output logic from FIG. 5, the following relationships exist as shown in Table 1 below.

TABLE 1

Illustrative Logic.

| SWITCH OUTPUTS | COLOR STRAND ENABLE/DISABLE |
|---|---|
| 0111111111 | 111111 |
| 1011111111 | 110111 |
| 1101111111 | 010111 |
| 1110111111 | 010101 |
| 1111011111 | 101110 |
| 1111101111 | 111010 |
| 1111110111 | 011011 |
| 1111111011 | 101101 |
| 1111111101 | 001111 |
| 1111111110 | 110101 |

Logic 204 in FIG. 6 may utilize simple logic gates suitable to achieve the desired logic outputs (i.e. that shown in Table 1 above). In the embodiment shown in FIG. 6, logic 204 utilizes simple AND gates. As is apparent from the configuration of switch mechanism 202 and the logic of the AND gates, the decorative lighting apparatus will operate as previously described. In this embodiment, the colored lights are powered through switching transistors 520. However, other well-known logic and powering alternatives may be utilized. Also, as one skilled in the art will readily understand, the holiday color schemes may be enhanced by providing flickering and/or fading in and out using well-known conventional techniques.

Instead of using simple logic gates, logic 204 is alternatively a microcontroller or microprocessor programmed with embedded software to accomplish the same result. If this approach is utilized, then multiple decorative lighting strand products providing different decorative color schemes may be made using the same hardware, bulbs, and switch. The only varying aspect from product to product is the software and the plastic icon overlay utilized. In fact, the hardcoded software in read-only memory (ROM) need not be different or ever change if the microprocessor is provided or utilized with an electronically erasable/programmable ROM (EEPROM) which may be flexibly programmed and/ or pre-programmed with suitable bit masks (e.g., see table 500 in FIG. 5) from product to product for selecting which colors should be lit. This alternative approach is particularly advantageous so that a variety of different product lines that differ only by software (or programmed EEPROM data) and plastic icon overlay may be easily manufactured. Thus, the logic used may be a controller, a processor, logic gates, or combinations thereof.

Figure 7:
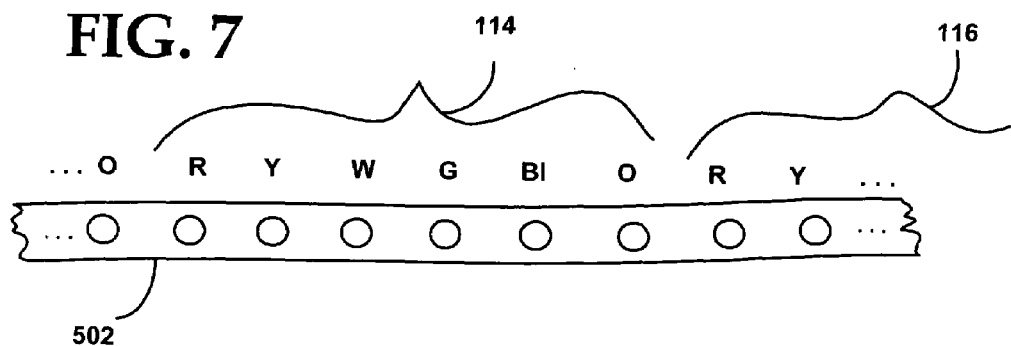
FIG. 7 is a particular embodiment where the light strand is embodied in a flexible translucent rope or tube.

FIG. 7 is an embodiment where the light strands of decorative lighting apparatus 100 of FIG. 1 are embodied in a flexible translucent rope 502 which may be made of plastic. Such rope 502 is conventionally employed in what is referred to as a "rope light", for example the Duralight Ropelight which may be obtained from DFB Sound & Light Warehouse Ltd in the United Kingdom. Containment of the bulbs and wires within such a conventional flexible translucent rope is preferable since the wires and non-lit bulbs are not readily visible.

Figure 8:
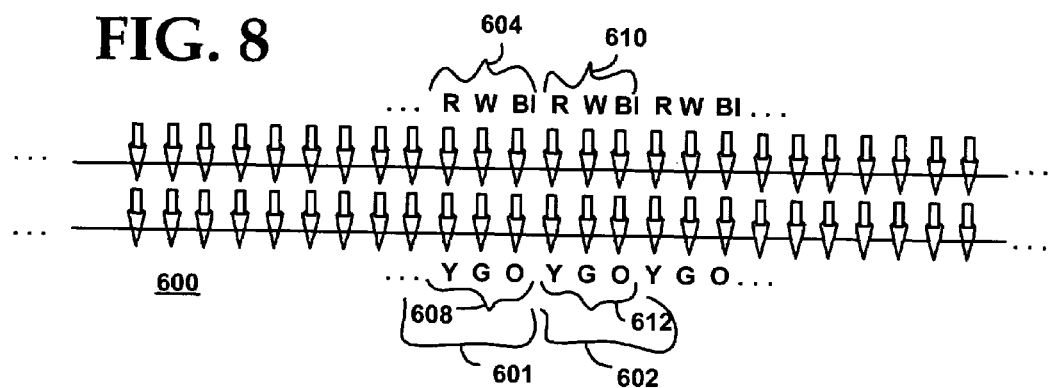
FIG. 8 is an alternative arrangement of the lights where two rows of lights are positioned side by side.
Figure 9:
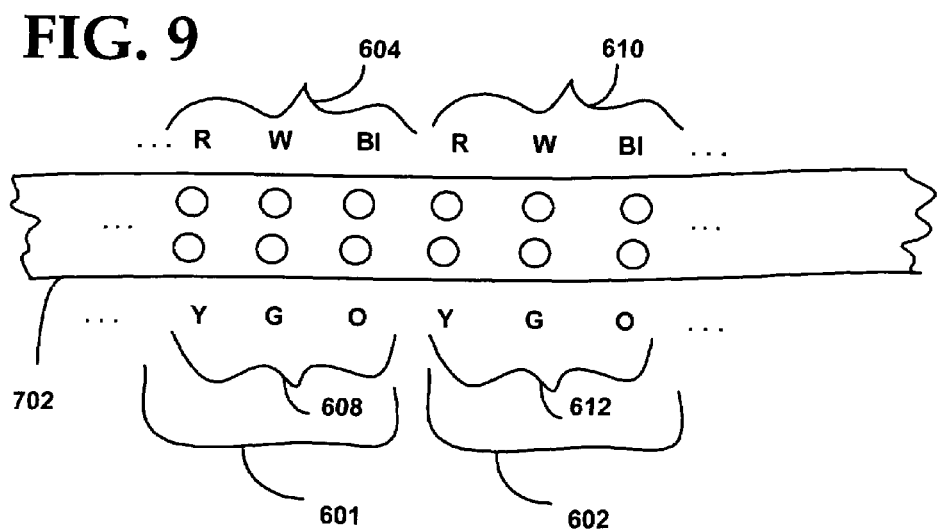
FIG. 9 is the alternative arrangement of FIG. 8 embodied in a flexible translucent rope or tube.

FIG. 8 is an alternative arrangement of the lights where two rows of lights are positioned side by side. A first light strand portion 601 includes a first row strand 604 having a first set of colors and a second row strand 608 having a second set of colors different from the first set. In this embodiment, the first set of colors of first row strand 604 are red, white, and blue, and are ordered in that manner as well. The second set of colors of second row strand 608 are yellow, green, and orange, and are ordered in that manner. FIG. 9 is the alternative arrangement of FIG. 8 embodied in a flexible translucent rope 702 ("rope lights"). The arrangement of FIGS. 8 and 9 may be preferable if even closer spacing between bulbs is desired.

Figure 10:
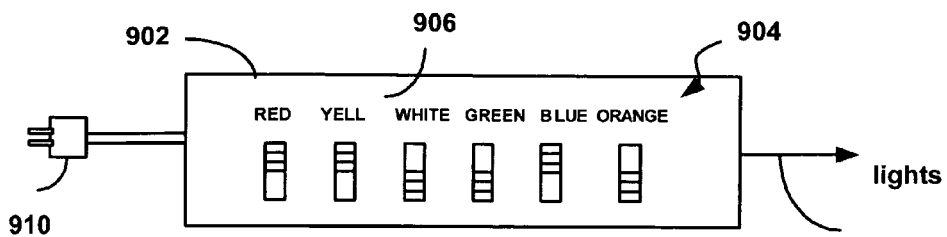
FIG. 10 is a dip switch which may be utilized for the decorating selector for selecting the colors of the lights.
Figure 11:
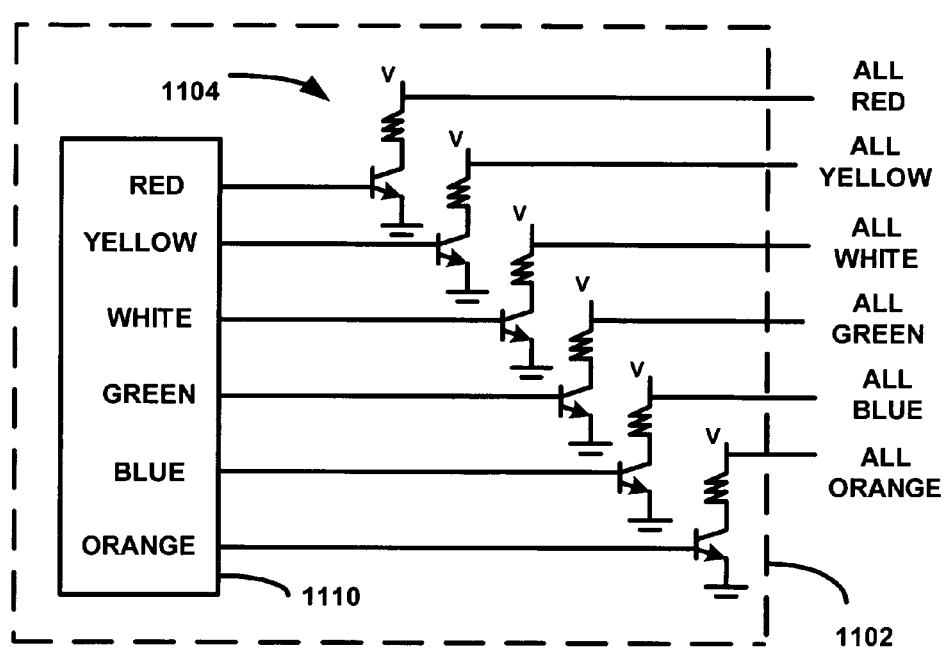
FIG. 11 is a block diagram of circuitry which may be utilized for the dip switch of FIG. 10.

FIG. 10 is a different configuration where an alternative switch 902 is utilized for the decorating selector 104 of FIG. 1 for selecting the colors of the lights. In this embodiment, switch 902 is actually a dip switch which provides for the selection of specific colors to be turned on/off. A housing 906 carries the dip switch; an A/C power plug 910 is connected to housing 906 as are light strands 908. The decorative lighting apparatus in this embodiment otherwise has similar structure and functionality as that described in relation to FIGS. 1-2 and 7-9. FIG. 11 is a block diagram of circuitry 1102 which may be utilized for the dip switch of FIG. 10. Switch mechanism 1110 has logic outputs for each color, where each output is a '1' for off and a '0' for on. In this embodiment, the colored lights are powered through switching transistors 1104. However, other suitable powering alternatives may be utilized. Decorative outcomes similar to those described in relation to FIGS. 1-6 may be achieved utilizing this dip switch technique, but where the end-user has complete control over each color.

As an added feature, the light strand arrangements described herein may utilize a wireless remote control device for selecting one of the desired color schemes. In this case, a wireless receiver with antenna is coupled to the logic for receiving the wireless signal and control command from the wireless remote control device and thereafter setting the outputs to configure the appropriate color scheme.

Figure 12:
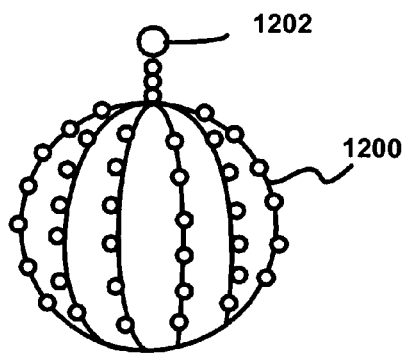
FIG. 12 is an alternative decorative apparatus (i.e. a decorative holiday ball) for use in connection with the present invention.

FIG. 12 is an alternate embodiment of a decorative lighting apparatus of the present invention. More particularly, FIG. 12 shows a decorative holiday ball 1200 which may be hung from a ceiling by an attachment 1202 (e.g., a chain or rope). In this embodiment, the decorative holiday ball 1200 is made from a skeletal structure of light-weight metal or plastic which is formed into a sphere. This sphere is decorated with lights, and could be decorated with other decorative materials such as decorative paper, streamers, etc. Ball 1200 is configured to function in the same manner as that described in relation to FIGS. 1-11 and is selectively illuminated with a different holiday color scheme based on the user-selectable setting. Note that, although a sphere is shown and described, any suitable shape such as a star, cylinder, or 2-dimensional planar shape may be formed. Note also that each separate vertical strand on the structure may have the same light color sequence as the others. Alternatively, every other vertical strand along the structure may have the same color sequences when the two different colored strands shown and described in relation to FIG. 8 are used. Also alternatively, each separate vertical strand on the structure may provide only a single color where three or more separately colored strands are utilized to provide the same functionality as described herein. Thus, as another variation to that described in relation to FIGS. 1-11, each separate color strand does not need not be intertwined with the others such that the different colored bulbs are interleaved, but rather each color strand can be placed adjacent to one another such that the different colored bulbs are side-by-side to form a decorative 2-dimensional plane.

Figure 13:
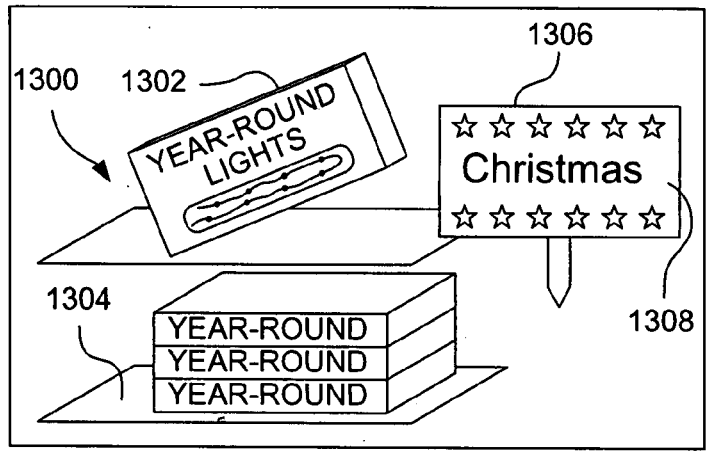
FIG. 13 is an illustrative depiction of store shelving which has a set of packaged year-round decorative lighting products for sale with use of a first displayed advertisement during a first holiday season.

FIG. 13 is an illustrative depiction of store shelving 1304 which has a plurality of packaged year-round decorative lighting products 1300 for sale with use of a first displayed advertisement 1306 during a first holiday season. Each packaged product 1300, such as packaged product 1302, preferably includes the apparatus of the type and construction of that shown and described above in relation to FIGS. 1-12; however any suitable type and construction which provides the same or similar functionality may be provided. Each packaged product 1302 includes packaging comprising a box or the like for holding and containing the decorative lighting apparatus, which may include a description of the product and its functionality provided thereby. Each packaged product has the same product identification code or Uniform Product Code (UPC) code.

Store shelving 1304 is preferably located in a department store (e.g. WalMart, Target, Walgreens, Sharper Image, etc.). However, store shelving 1304 is not necessary in some cases, for example, where packaged product 1300 is advertised and sold through electronic means such as television (e.g. the Home Shopping Network) or the Internet. In these cases, packaged product 1300 may be provided within a warehouse of a distributor or the like.

In the example of FIG. 13, first displayed advertisement comprises a sign having printed indicia 1308 indicative of the first holiday season. Indicia 1308 may be or include text or an image which conveys or represent the first holiday season. In this example of FIG. 13, the first holiday season is Christmas and the indicia 1308 on first displayed advertisement 1306 includes the words "Christmas" and/or an image of a Christmas tree. However, any suitable indicia may be utilized to represent this holiday season. Note that packaged product 1302 (as well as the others) provides a holiday color scheme corresponding to the first holiday season.

Figure 14:
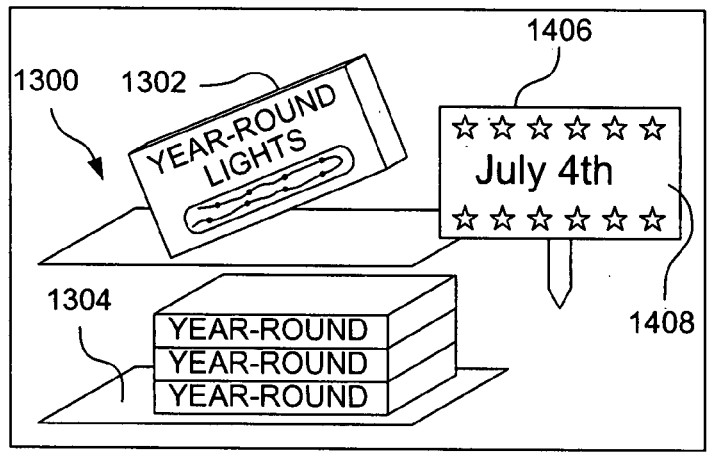
FIG. 14 is an illustrative depiction of the store shelving of FIG. 13 which has the set of packaged year-round decorative lighting products for sale with use of a second displayed advertisement during a second holiday season.

FIG. 14 is an illustrative depiction of the same store shelving 1304 which has the same type and construction of year-round apparatus product packaging 1300 for sale with use of a second displayed advertisement 1406 during a second holiday season. In FIG. 14, the second holiday season is Independence Day and indicia 1408 on second displayed advertisement 1406 includes the words "July 4$^{th}$" and/or an image of the American Flag. However, any suitable indicia may be utilized to represent this holiday season. Note that packaged product 1302 (as well as others) provides a holiday color scheme corresponding to the second holiday season.

Figure 15:
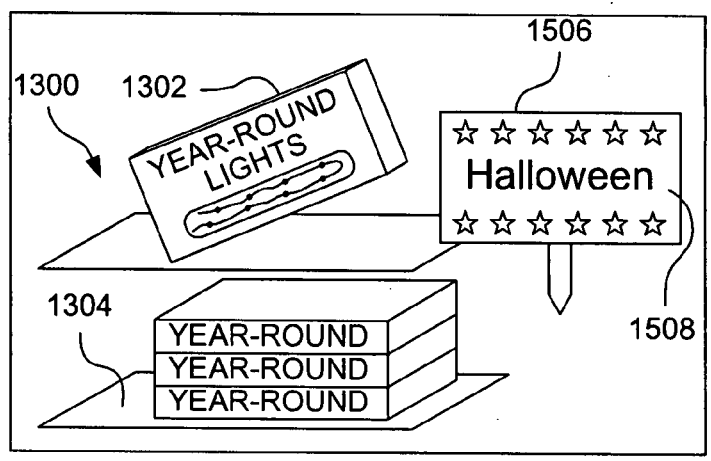
FIG. 15 is an illustrative depiction of the store shelving of FIGS. 13-14 which has the set of packaged year-round decorative lighting products for sale with use of a third displayed advertisement during a third holiday season.

FIG. 15 is an illustrative depiction of store shelving which has yet the same type and construction of year-round apparatus product packaging 1300 for sale with use of a third displayed advertisement 1506 during a third holiday season. In FIG. 15, the third holiday season is Halloween and indicia 1508 on third displayed advertisement 1506 includes the words "Halloween" and/or an image of a pumpkin. However, any suitable indicia may be utilized to represent this holiday season. Note that packaged product 1302 (as well as others) provides a holiday color scheme corresponding to the third holiday season.

Figure 16:
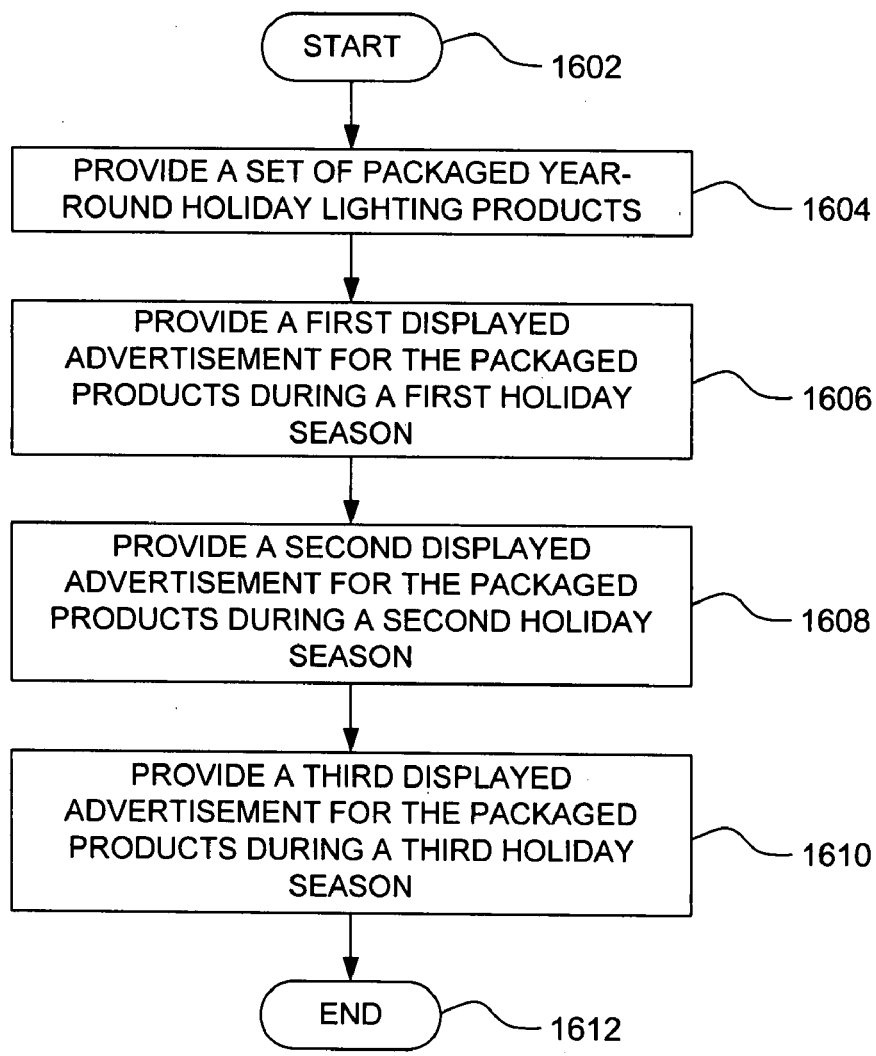
FIG. 16 is a flowchart of a method of advertising the set of packaged products of FIGS. 13-15 over a plurality of holiday seasons.

FIG. 16 is a flowchart of a method of advertising the set of packaged products of FIGS. 13-15 over a plurality of holiday seasons. Beginning at start block 1600 of FIG. 16, the set of packaged products is provided for sale on the store shelving or the like (step 1604 of FIG. 16). During the first holiday season (e.g. Christmas), the first displayed advertisement for the packaged products is provided at or near the store shelving of point of sale (step 1606 of FIG. 16). See FIG. 13. During the second holiday season (e.g. Independence Day), the second displayed advertisement for the packaged products is provided at or near the store shelving of point of sale (step 1608 of FIG. 16). See FIG. 14. During the third holiday season (e.g. Halloween), the third displayed advertisement for the packaged products is provided at or near the store shelving of point of sale (step 1610 of FIG. 16). See FIG. 15. Note that, from holiday season to holiday season, the packaged products have the same type and construction and packaging. The flowchart ends at an end block 1612.

Although only three holidays were discussed in relation to FIGS. 13-16, any suitable number of holidays may be advertised in the same or similar manner, which may depend on the number of different holiday color schemes provided by the packaged product. If Web or Internet advertising is utilized in the method of FIG. 16, the method is performed by a server via a computer network (e.g. the Internet) where the displayed advertisement is in the form of an image of a Web page or the like displayed on a computer for an end user, which may otherwise utilize conventional techniques in that field. It is noted that the same exact set of packaged products may not be provided on the shelves throughout the year, due to increasing inventory or sales or the like; however each packaged product is still preferably of the same type and construction as well as packaging.

One noted advantage of the method of FIGS. 13-16 is that the same packaged product may be maintained on the shelves or in inventory "year round", where merely the displayed advertisement needs to change in accordance with the holiday season. Conventional approaches require that different packaged products and/or different product packaging be provided (e.g. manufactured, shipped, or maintained in inventory) for each holiday season. The conventional approaches may require more effort and involvement for the sale and advertising of holiday decorations. The current approach is more efficient and economical for stores which sell and advertise holiday decorations. This is especially the case where each packaged product has the same product identification code or UPC code.

As described herein, a decorative light strand has user-selectable color schemes corresponding to each holiday for year-round use. In one illustrative embodiment, the light strand has a plurality of lights; a decorating selector comprising a switch which provides a plurality of user-selectable settings; and logic coupled to the switch and the plurality of lights to provide different holiday color schemes in response to the user-selectable settings. A method of advertising the same includes the steps of providing a set of packaged year-round holiday lighting products for sale; providing a first displayed advertisement for the packaged year-round holiday lighting products during a first holiday season, the first displayed advertisement including first indicia representative of the first holiday season; providing a second displayed advertisement for the packaged year-round holiday lighting products during a second holiday season, the second displayed advertisement including second indicia representative of the second holiday season; and providing a third displayed advertisement for the packaged year-round holiday lighting products during a third holiday season, the third displayed advertisement including third indicia representative of the third holiday season. This approach is more efficient and economical for stores which sell and advertise holiday decorations.

It is to be understood that the above is merely a description of preferred embodiments of the invention and that various changes, alterations, and variations may be made without departing from the true spirit and scope of the invention as set for in the appended claims. The particular color schemes for the holidays described herein are merely examples and may vary. Also, instead of providing U.S. holiday schemes, the settings may be suitable to provide a plurality of different geographical regional color schemes such as different flag colors for different states or countries (France, Germany, Italy, etc.) or different holiday schemes for non-U.S. country. Italy's flag colors are the same as Mexico's flag colors (e.g. Cinco De Mayo holiday): red, white, and green. Alternatively, the settings may provide color schemes which correspond to a plurality of different sports teams such as different football teams (Chicago Bears, New York Giants, San Diego Chargers, etc.), baseball teams, soccer teams, hockey teams, etc. None of the terms or phrases in the specification and claims has been given any special particular meaning different from the plain language meaning to those skilled in the art, and therefore the specification is not to be used to define terms in an unduly narrow sense.

What is claimed is:

1. A method of advertising a set of packaged year-round holiday lighting products comprising the acts of:

providing a set of packaged year-round holiday lighting products, each year-round holiday lighting product contained within packaging of the product and illuminating a plurality of different holiday color schemes in response to a corresponding plurality of user-settable switch settings;

providing a first displayed advertisement for the packaged year-round holiday lighting products during a first holiday season which corresponds to a first one of the different holiday color schemes of the year-round holiday lighting product, the first displayed advertisement including first indicia representative of the first holiday season;

providing a second displayed advertisement for the packaged year-round holiday lighting products during a second holiday season which corresponds to a second one of the different holiday color schemes of the year-round holiday lighting product, the second displayed advertisement including second indicia representative of the second holiday season; and providing a third displayed advertisement for the packaged year-round holiday lighting products during a third holiday season which corresponds to a third one of the different holiday color schemes of the year-round holiday lighting product, the third displayed advertisement including third indicia representative of the third holiday season.

2. The method of claim 1, wherein the act of providing the set of packaged year-round holiday lighting products comprises the further act of providing the set of packaged year-round holiday lighting products on store shelving.

3. The method of claim 1, wherein the act of providing the set of packaged year-round holiday lighting products comprises the further act of providing the set of packaged year-round holiday lighting products in inventory for Internet sales.

4. The method of claim 1, wherein the acts of providing the displayed advertisements is performed at least in part by a server of a computer network.

5. The method of claim 1, wherein the first holiday season corresponds to Christmas and the second holiday season corresponds to Halloween.

6. The method of claim 1, wherein the first holiday season corresponds to Christmas and the second holiday season corresponds to Independence Day.

7. The method of claim 1, wherein the displayed advertisements comprise a sign.

8. The method of claim 1, wherein each year-round holiday lighting product being of the same type and construction.

9. The method of claim 1, wherein the displayed advertisements are positioned adjacent the set of year-round holiday lighting products.

10. The method of claim 1, wherein each packaged product has the same product identification code.

11. The method of claim 1, wherein each year-round holiday lighting product comprises a decorative light strand.

* * * * *

UNITED STATES PATENT AND TRADEMARK OFFICE
CERTIFICATE OF CORRECTION

| | | |
|---|---|---|
| PATENT NO. | : 7,257,551 B2 | Page 1 of 1 |
| APPLICATION NO. | : 11/100254 | |
| DATED | : August 14, 2007 | |
| INVENTOR(S) | : Oskorep et al. | |

It is certified that error appears in the above-identified patent and that said Letters Patent is hereby corrected as shown below:

Column 1: Lines 9 and 10: please delete "Jan. 10, 2003" and replace with --Dec. 10, 2003--

Signed and Sealed this

Twenty-seventh Day of November, 2007

JON W. DUDAS
*Director of the United States Patent and Trademark Office*